Figure 1:
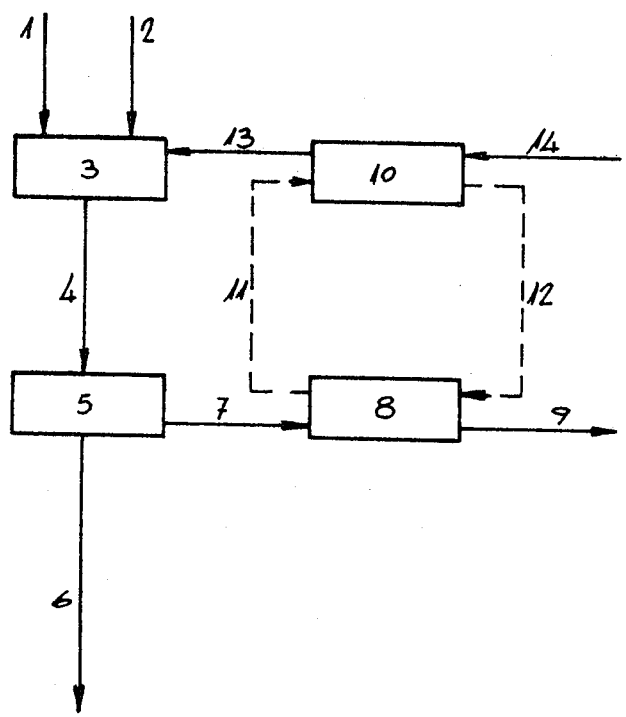

United States Patent [19]

Manor et al.

[11] 4,378,342

[45] Mar. 29, 1983

[54] PROCESS FOR THE MANUFACTURE OF POTASSIUM NITRATE

[75] Inventors: Shalom Manor, Haifa; Moshe Bar-Guri, Kfar Hasidim; Amiad Alexandron; Moshe Kreisel, both of Haifa, all of Israel

[73] Assignee: Haifa Chemicals Ltd., Haifa, Israel

[21] Appl. No.: 249,355

[22] Filed: Mar. 31, 1981

[30] Foreign Application Priority Data

Apr. 20, 1980 [IL] Israel ........................................ 59884

[51] Int. Cl.$^3$ ................................................ C01C 9/04
[52] U.S. Cl. ...................................... 423/399; 423/390
[58] Field of Search ........................ 423/390, 399, 408; 22/297 R

[56] References Cited

U.S. PATENT DOCUMENTS 1,816,303  7/1931  Thorssell ............................. 423/399
2,902,341  9/1959  Baniel et al. ......................... 423/399
4,291,007  9/1981  Baniel ................................. 423/390

FOREIGN PATENT DOCUMENTS 1383684  11/1964  France ................................ 423/399

OTHER PUBLICATIONS

"Chem. Abst.", vol. 54, 25,626g.
"Chem. Abst.", vol. 74, 68,375j.
Solovkin, A. S., "Zh. Neorg. Khim."; vol. 16; 1971; pp. 272–273.

Primary Examiner—G. Peters
Attorney, Agent, or Firm—Schwartz, Jeffery, Schwaab, Mack, Blumenthal & Koch

[57] ABSTRACT

The present invention relates to a process for the manufacture of potassium nitrate from potassium chloride and nitric acid. According to the invention, potassium chloride and nitric acid are reacted in an aqueous medium at a temperature in the range of between $-25°$ C. to $+10°$ C. From the brine solution obtained after the separation of the resulting potassium nitrate, nitric acid is extracted by an organic solvent solution containing at least one compound selected from the group consisting of ketones having five to ten carbon atoms, straight or cyclic polyethers having molecular weight in the range of 100 to 1000, polyalkylene glycols slightly miscible in water and having molecular weight in the range of 1000 to 3000, and organic esters of phosphoric acid, phosphonic acid and phosphinic acid, or mixtures thereof, in an organic diluent which does not substantially extract hydrochloric acid. The remaining aqueous solution consists of a substantially nitrate-free brine containing hydrochloric acid. The $NO_3^-$-loaded solvent is washed, the nitric acid as well as the organic solvent being respectively recycled in the process. The process saves appreciable amounts of nitric acid. Optionally, pure hydrochloric acid could be obtained from the nitrate-free brine, by distillation or by solvent extraction using butanols or pentanols as extractants.

11 Claims, 2 Drawing Figures

PROCESS FOR THE MANUFACTURE OF POTASSIUM NITRATE

The present invention relates to the manufacture of potassium nitrate by the reaction of potassium chloride with nitric acid. More specifically, the invention relates to the manufacture of potassium nitrate, wherein a substantially complete recovery of the nitric acid is achieved and, optionally, potassium-free aqueous solutions of hydrochloric acid, of relatively high concentration, are obtained as by-product.

Potassium nitrate is now fully recognized as one of the most important potassium fertilizers which contains 46.58% potash (expressed as $K_2O$) and 13.6% nitrogen (N). As a chemical compound it is neutral and its nitrogen-potassium oxide ($N:K_2O$) ratio of approximately 1:3.4 is fixed. Pure potassium nitrate is only slightly hygroscopic and less subject to caking than pure potassium chloride. Potassium nitrate is also less hygroscopic than other nitrate salts used as fertilizer.

Most of the potassium nitrate made until 1967 was obtained from reacting sodium nitrate with potassium chloride. The potassium nitrate thus manufactured was aimed principally at industrial applications because of its high cost. In 1968 a plant was erected at Haifa Chemicals Ltd. (Haifa, Israel) to produce potassium nitrate from potassium chloride and nitric acid, using solvent extraction technique in accordance with Israeli Pat. Nos. 9539 and 9660 and their corresponding U.S. Pat. Nos. 2,902,341 and 2,894,813. According to these patents the process involves the reaction:

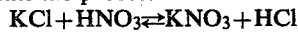

$KCl + HNO_3 \rightleftarrows KNO_3 + HCl$

The essence of the process lies in the removal of HCl from the reaction mixture, thus driving the equilibrium to the right. This is accomplished by contacting the reaction mixture with an organic solvent, partially miscible with water, into which the HCl formed is extracted. The reactants, nitric acid and potassium chloride are fed to the reaction, substantially in stoichiometric proportions. In the presence of a solvent, the transformation of KCl to $KNO_3$ is complete and takes place virtually in the solid phase. For processing convenience, however the presence of a certain quantity of aqueous phase is preferable, this aqueous phase being an acid-containing brine at a level dependent on the reaction temperature and the acidity of the reaction solvent, which is saturated with respect to KCl and $KNO_3$. The water balance over the entire process is so adjusted that the quantity of aqueous phase (brine) remains constant. The preferred reaction temperature is in the range of 0° C. to 10° C., said patent mentioning that the reaction between the KCl and $HNO_3$ and the extraction are carried out at temperature not exceeding 63° C. The conversion of KCl into $KNO_3$ is carried out in a series of stirred reactors, the reactants, recycle solvent and recycle brine being fed to the first vessel. The three-phase reaction mixture consisting of (1) solid potassium nitrate; (2) hydrochloric acid and nitric acid-charged solvent; and (3) the brine, are fed to a decanting vessel. The solvent phase is separated and is passed to the liquid-liquid contacting system to remove as by-product hydrochloric acid in the form of a very dilute aqueous solution having a concentration of between 5 to 8% by wt. In order to become a saleable product, this hydrochloric acid requires substantial concentration in a multiple effect evaporator, but this means additional costs and energy requirement, which are of course a disadvantage of the process.

The organic solvents used in the above process are specific for acids, i.e. salts are not extracted, but they suffer from the fact that they are not selective for hydrochloric acid, so that nitric acid is coextracted. This is another disadvantage of the process, which requires an additional treatment of the solution, for example, treatment with formaldehyde to eliminate its nitrates content. In addition to the fact that this additional treatment consists a nuisance for the entire process, it also requires reagents and thus effects to a certain extent the costs of production. The organic solvents claimed in the above mentioned U.S. Patents are selected from the group consisting of aliphatic monohydric alcohols having four to five carbon atoms.

The process of potassium nitrate manufacture as utilized at Haifa Chemicals plant is based on the conversion of potassium chloride into potassium nitrate utilizing amyl alcohol as the organic solvent.

Although the process operates smoothly, being quite attractive from an economic point of view, it suffers from two main disadvantages:

(1) The excess of reaction brine accumulating in the reaction system contains about 6% nitric acid which has to be eliminated by an additional treatment, and
(2) the low concentration of the hydrochloric acid by-product obtained.

In the last twenty years several theoretical papers appeared in the literature on the preferential extraction of low ionization acids such as nitric acid, over highly ionized acids such as hydrochloric acid. Thus, for instance, in determination of extractions carried out for nitric acid and hydrochloric acid separately (Baldwin et al., J. Phys. Chem. 63, 118, 1959) in a system of tributyl phosphate and water containing one of said mineral acids, it was found that the largest distribution coefficient measured between an organic and aqueous phase is for $HNO_3$ followed by HCl. Two different mechanisms were proposed:

(a) $HNO_3$ displaces water from tributyl phosphate and is extracted due to the formation of a specific salt complex, and
(b) HCl adds water to tributyl phosphate and its extraction is usually difficult and strongly influenced by hydration phenomena.

Another review (Irving et al, J. Inorg. Nucl. Chem., 10, 306, 1959) compared the extraction of HCl versus $HNO_3$ respectively, with, tributyl phosphate and kerosene mixtures from aqueous solutions. The coefficients of distribution reported for, $HNO_3$ and HCl separately, with various mixtures of tributyl phosphate: kerosene, shown that in all cases, $HNO_3$ extracts better than HCl. The above references on the preferential extraction of one acid over another which might have some importance from a theoretical point of view, should be considered as part of the general background but without any teaching on its possible use from a mixture of these mineral acids and, particularly, in a complex technological system such as prevails in the manufacture of potassium nitrate.

It is an object of the present invention to provide a simple process for the manufacture of potassium nitrate from potassium chloride and nitric acid, the reaction between said reagents being carried out in an aqueous medium in the absence of an organic solvent. It is another object of the present invention to provide a process for the manufacture of potassium nitrate from potassium chloride and nitric acid, wherein substantially no losses of nitric acid are encountered. It is yet another object of the present invention to provide a simple process for the manufacture of potassium nitrate from potassium chloride and nitric acid wherein the nitrate-free brine may be further processed to obtain a substantially potassium-free, relatively concentrated solution of aqueous hydrochloric acid by-product.

Thus the invention consists in a process for the manufacture of potassium nitrate from potassium chloride and nitric acid, which comprises the steps of:

(a) carrying out the reaction between potassium chloride and nitric acid in an aqueous medium at a temperature in the range of between $-25°$ C. to $+10°$ C., said reactants being in the range of 0.9 mole of $HNO_3$ per mole of KCl and up to 3 moles of $HNO_3$ per mole of KCl;

(b) separating the crystals of potassium nitrate from the resulting brine containing $K^+$, $Cl^-$, $H^+$ and $NO_3^-$ ions;

(c) extracting the nitric acid from the brine obtained in step (b) by an organic solvent solution containing at least one compound selected from the group consisting of ketones having five to ten carbon atoms, straight or cyclic polyethers having molecular weights in the range of 100 to 1000, polyalkylene glycols slightly miscible in water and having molecular weights in the range of 1000 to 3000 and phosphorus containing organic compounds such as derivatives of phosphoric acid, phosphonic and phosphinic acid, and phosphine oxide derivatives, in an organic diluent which does not extract hydrochloric acid, obtaining a $NO_3^-$-loaded solvent extract and producing a $NO_3^-$-free brine containing hydrochloric acid, and (d) washing the $NO_3^-$-loaded solvent extract, the recovered aqueous nitric acid being recycled into step (a).

The potassium nitrate product is obtained as crystals in a pure form without any occluded impurities.

One of the main advantages of the process is the fact that substantially no losses of nitric acid are encountered, any unreacted nitric acid going out from the reaction system, being quantitatively recovered and recycled to the process after washing the solvent extract in step (d). The above advantage is contrary to the process described in said U.S. Patents, wherein any unreacted nitric acid should be eliminated, e.g. by its being destroyed with the aid of chemical reagents. Another advantage of the process according to the present invention is the fact that the subsequent handling of the $NO_3^-$-free brine is more convenient than the original brine with the nitric acid which is very corrosive. The process can be carried out either continuously or in a batch manner. If the process is performed batchwise, either complete or partial conversion of the potassium chloride to potassium nitrate may be obtained, depending upon the specific case and the reaction conditions employed. In the case of a partial conversion, the mixture of potassium nitrate and potassium chloride may be commercially used as a fertilizer.

The resulting brine after extraction obtained in step (c), contains appreciable amounts of hydrochloric acid and being free of nitric acid should be considered a valuable starting material for various processes. Typical examples of such processes are the production of copper oxychloride or various oxychlorination reactions e.g. the production of vinyl chloride monomer, wherein the presence of small amounts of foreign impurities does not interfere the reactions. When pure hydrochloric acid is required, this can be easily accomplished by distillation from said nitrate-free brine, as known in the art. Since the brine entering into the distillation system is nitric acid-free, no particularly corrosion problems would be expected in the equipment utilized for said distillation.

According to another embodiment, the hydrochloric acid present in the $NO_3^-$-free brine obtained in step (c), can be recovered by solvent extraction, using an organic solvent possessing a selective extraction power towards hydrogen chloride. The literature is quite abundant with such solvents, preferred solvents according to the present invention being selected from the group consisting of primary, secondary and tertiary alcohols which are sparingly soluble in water. Optionally, these organic solvents are used in conjunction with an inert organic diluent. The hydrochloric acid-loaded solvent can easily be washed with water, thus obtaining relatively concentrated aqueous solutions of hydrochloric acid. This embodiment has a particular advantage, by saving considerable amounts of fuel, which are required for concentration of aqueous solutions of hydrochloric acid. A person skilled in the art, will select the particular method according to the commodities and facilitates available at the plant producing the potassium nitrate.

One of the main features which characterizes the improved process for the manufacturing of potassium nitrate according to the present invention, is the extraction of the nitric acid from the brine resulting after the separation of the potassium nitrate.

Suitable classes of solvents are: ketones having between five and ten carbon atoms, straight or cyclic polyethers having molecular weight in the range of 100 to 1000, polyalkylene glycols slightly miscible in water and having molecular weight in the range of 1000 to 3000 and phosphorus-containing organic compounds such as derivatives of phosphoric acid, phosphonic acid, phosphinic acid and phosphinic oxide derivatives. Typical examples of such solvents are methyl isobutyl ketone, methyl cyclohexanone, methyl ethyl ketone, methyl propyl ketone, dibutyl ether, diethylene glycol di-butyl ether, polypropylene glycol (M.W. 2000 ), tributyl phosphate, trioctyl phosphine oxide, tributyl phosphine oxide, triphenyl phosphine oxide, hydrogen dibutyl phosphate etc. It could be also preferable to utilize these solvents in conjunction with an inert organic diluent such as toluene, benzene, kerosene and, particularly, dearomatized kerosene.

One of the most preferred solvents for the extraction of the nitrate values from the brine resulting after the separation of the potassium nitrate is selected from the trialkyl phosphates, in particular suitable being tributyl phosphate. This solvent fulfills practically all requirements of an organic solvent for an industrial purpose such as: almost complete water insolubility, low vapor pressure and availability at relatively low costs. However, tributyl phosphate being an organic ester could be conceived to undergo an easy hydrolysis in the very concentrated acidic brine which prevails in the system according to the present invention. It has been unexpectedly found, that tributyl phosphate is almost completely stable when utilized with an inert organic diluent, such as dearomatized kerosene, at a temperature range of between 0° C. and 25° C. which might be encountered in the process.

The stability of solutions of tributyl phosphate (TBP) in dearomatized kerosene under the working conditions of the process according to the present invention, has been demonstrated by direct methods such as Gas-Liquid Chromatography (GLC) and Infrared Spectroscopy (IR) as well as by indirect methods such as absence of butanol and phosphate ion decomposition products in the aqueous brine resulting from the process.

The stability results are illustrated in the following Tables 1, 2, 3 and 4 which summarize GLC and IR data with TBP with or without diluents, after having been contacted under constant mechanical stirring with aqueous acidic brine at 0° C. and at 28° C., the volume ratio of organic to aqueous phases being kept at 1:10. The above tests were followed by testing for butanol and phosphate ion in the conjugated aqueous phase, the results for both being negative for all periods of contact.

TABLE 1.

Stability tests for TBP at 0° C. by Gas Liquid Chromatography.
Composition of aqueous phase (in g/l)
$H^+$: 8; $K^+$: 19.6; $Cl^-$: 200; $NO_3^-$: 198.

| Diluent | % Tributyl phosphate after contact days | | | | | |
|---|---|---|---|---|---|---|
|  | 0 | 3 | 5 | 10 | 17 | 27 |
| None | 98 | 97 | 98 | 98 | 98 | 95 |
| 30% (by vol.) in dearomatized kerosene | 32 | 32 | 31 | 29 | 29 | 29 |

TABLE 2.

Stability tests for TBP at 23° C. by Gas Liquid Chromatography.
Composition of aqueous phase (in g/l)
$H^+$: 7.6; $K^+$: 26.2; $Cl^-$: 205; $NO_3^-$: 153.

| Diluent: dearomatized kerosene | % Tributyl phosphate after contact days | | | |
|---|---|---|---|---|
|  | 0 | 1 | 7 | 10 |
| 10% TBP | 10 | 11.5 | 9.5 | + (+not determined) |
| 20% TBP | 20 | 20 | 20 | 20 |
| 30% TBP | 30 | 30 | + | 27 |

TABLE 3.

Stability tests for TBP at 0° C. by Infrared Spectroscopy (IR).
(The composition of the aqueous brine was as in Table 1).

| Frequency | IR absorbance. | | | | | | | | | | | |
|---|---|---|---|---|---|---|---|---|---|---|---|---|
|  | 1030 cm$^{-1}$ | | | | | | 1260 cm$^{-1}$ | | | | | |
|  | days of contact: | | | | | | | | | | | |
| Diluent | 0 | 3 | 5 | 10 | 17 | 27 | 0 | 3 | 5 | 10 | 17 | 27 |
| None | 76 | 75 | 77 | 76 |  | 74 | 57 | 54 | 54 | 54 |  | 55 |
| 30% (by vol.) in dearomatized kerosene | 58 | 57 | 58 | 61 | 53 | 57 | 29 | 28 | 28 | 30 | 22 | 28 |
| 30% (by vol.) in chloroform | 76 | 76 | 78 | 76 | 74 | 77 | 50 | 60 | 58 | 56 | 47 | 57 |

(The stretching frequency of 1030 cm$^{-1}$ is characteristic of the P→O bond and that of 1260 cm$^{-1}$ is characteristic of the P-O-C bond (which exist in TBP.)

TABLE 4.

Stability tests for TBP at 23° C. by Infrared Spectroscopy (IR).
(The composition of the aqueous brine was as in Table 2).

| Diluent dearomatized kerosene | 1030 cm$^{-1}$ | | | 1260 cm$^{-1}$ | | |
|---|---|---|---|---|---|---|
|  | days of contact | | | | | |
|  | 0 | 4 | 10 | 0 | 4 | 10 |
| 10% TBP | 24 | 24 | 25 | 6 | 7 | 7 |
| 20% TBP | 40 | 41 | 43 | 14 | 14 | 15 |

TABLE 4.-continued

Stability tests for TBP at 23° C. by Infrared Spectroscopy (IR).
(The composition of the aqueous brine was as in Table 2).

| Diluent dearomatized kerosene | 1030 cm$^{-1}$ | | | 1260 cm$^{-1}$ | | |
|---|---|---|---|---|---|---|
|  | days of contact | | | | | |
|  | 0 | 4 | 10 | 0 | 4 | 10 |
| 30% TBP | 52 | 52 | 54 | 20 | 20 | 22 |

The conclusion which can be drawn from the above Tables is that TBP is completely stable in contact with the concentrated acidic aqueous brine solution even after prolonged periods of contact.

From the practical point of view the range of 10% to 30% TBP in dearomatized kerosene is preferable; higher concentrations will cause difficulties in phase separations and handling.

Various modifications or alterations to the scheme presented can be envisaged without being outside the scope of the present invention. Thus in the reaction system, the concentration of the nitric acid can be in a very broad range of between 20% to 75% (wt. percent). Of course, a higher concentration will be preferred in order to deal with lower volumes of reaction products and also to obtain a higher concentration of hydrochloric acid. On the other hand, lower concentrations of nitric acid which might be available in a plant, could be successfully utilized in the process according to the present invention.

It has been found according to the present invention, that a small number of stages will be sufficient to completely extract the nitric acid from the brine as obtained after the removal of potassium nitrate, containing nitric acid and hydrochloric acid together with the unreacted potassium chloride. This is a result of the relatively high distribution coefficients which exist in the system. In the following Table 5 are summarized some equilibrium concentrations obtained in the extraction of the nitric acid content from actual brines obtained in the process according to the present invention, by tributyl phosphate in dearomatized kerosene (25% by volume) as diluent.

TABLE 5

Distribution coefficients (D) of $NO_3^-$ and $Cl^-$ at equilibrium (at room temperature).

The composition of the organic phase: TBP in dearomatized kerosene, at various concentrations.
The composition of the aqueous phase: 7.7 g/l $H^+$; 209 g/l $Cl^-$; 138 g/l $NO_3^-$ and 20 g/l $K^+$.

$$D = \frac{\text{concentration in organic phase}}{\text{concentration in aqueous phase}}$$

| Concentration of TBP (by vol.) | $D_{Cl^-}$ | $D_{NO_3^-}$ |
|---|---|---|
| 10% | 0.033 | 0.10 |
| 20% | 0.030 | 0.15 |
| 30% | 0.026 | 0.22 |

The above figures show clearly the preferential extraction of the nitrate ion by the TBP over the chloride ion. Therefore this method could be successfully applied for the removal of appreciable amounts of $NO_3$ ions codissolved with $Cl^-$ ions in aqueous acidic brine.

One of the advantages of the present invention is the fact that inexpensive plastic material such as ordinary polyvinyl chloride (P.V.C.) can be used as material of construction for the equipment. However, tributyl phosphate or ketones are known as plasticizers so that PVC would appear to be unsuitable and a more expensive construction material would be required. It was discovered by the present inventors, that the incorporation of a pentanol or a butanol e.g. amyl alcohol, in the range of 1 part of TBP (or ketone) to 7 parts butanol or pentanol to 12 parts of TBP (or ketone) to 1 part butanol or pentanol, has a stabilizing effect on the PVC.

The temperature range for carrying out the reaction is between $-25°$ C. and $+10°$ C. and preferably between $-20°$ C. and $0°$ C. The optimal conditions will be selected by varying the ratio between the reactants and the temperature, in accordance with the required purity of the solid product. Thus, for instance, a lower temperature of about $-20°$ C. will lower the rate of potassium nitrate which will precipitate, while the upper temperature limit, will be determined by the solubility data. The reaction time is quite short and can vary in accordance to the other parameters of the system, generally being in a range of about 5 to 60 minutes.

If a higher purity of the potassium nitrate product is desired, it would be preferable to wash the crystals coming out from step (b) with an aqueous solution saturated with potassium nitrate. This additional treatment will remove the adhering brine, the crystals of potassium nitrate being subsequently separated by a centrifuge.

Figure 2:
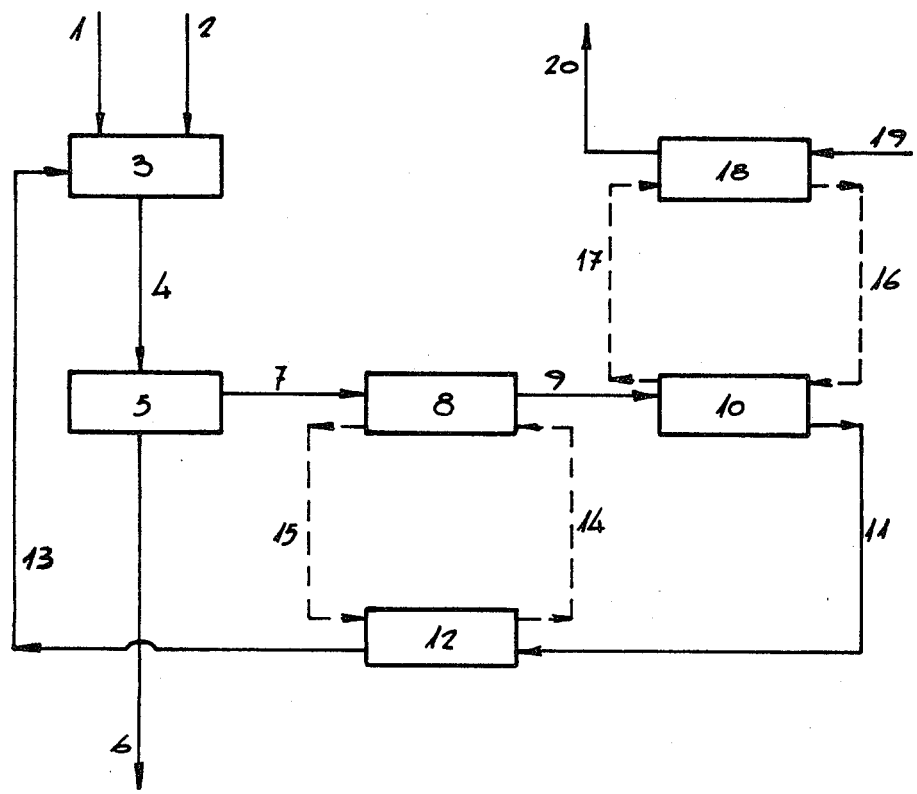

While the invention will now be described in connection with two preferred embodiments as illustrated in FIGS. 1 and 2, wherein two block diagrams describing the process are presented, it will be understood that it is not intended to limit the invention to these particular embodiments. FIG. 1 represents in a schematic manner a block diagram of one embodiment according to the present invention, wherein a $NO_3^-$-free brine containing hydrogen chloride is obtained as by-product to potassium nitrate. Streams of nitric acid (1) and potassium chloride (2) are introduced into a cooled reaction vessel 3, wherein the reaction between the two reagents takes place. The reaction products in the aqueous phase are conveyed through stream (4) into a decanter vessel 5, wherein wet crystals of potassium nitrate, with or without potassium chloride depending on reaction parameters, are separated and wet crystals of potassium nitrate product are removed from stream (6). The aqueous phase containing mainly hydrochloric acid, nitric acid and small amounts of potassium salts, is conveyed through stream (7) into a multi-stage liquid-liquid contactor 8, wherein a washed selective organic solvent solution for $NO_3^-$ is also introduced through stream (12). The resulting brine obtained as stream (9) is substantially free from any nitrate ion and contains hydrogen chloride as main constituent. The organic phase stream (11) loaded with essentially nitric acid, enters into a multi-stage liquid-liquid contactor 10, wherein a water stream (14) is also introduced. The aqueous phase stream (13), consisting of substantially nitric acid, is returned to reaction vessel 3.

FIG. 2 represents in a schematic manner, a block diagram of another preferred embodiment wherein the hydrochloric acid is recovered by solvent extraction. Stream of nitric acid (1) and potassium chloride (2) are introduced into a cooled reaction vessel 3, wherein the reaction between the two reagents takes place. The reaction products in the aqueous phase are conveyed through stream (4) into a decanter vessel 5 wherein wet crystals of potassium nitrate, with or without potassium chloride, depending on reaction parameters, are separated and wet crystals of potassium nitrate product are removed from stream (6). The aqueous phase containing mainly hydrochloric acid, nitric acid and potassium salts is conveyed through stream (7) into a multi-stage liquid-liquid contactor 8, wherein a washed selective organic solvent solution is also introduced through stream (14). The resulting aqueous brine containing mainly hydrochloric acid and potassium salts, is conveyed through stream (9) and enters into another multi-stage liquid-liquid contactor 10, wherein it comes in contact with another washed organic solvent solution (16) which extracts only the hydrochloric acid leaving the potassium salts in the aqueous solution. The aqueous phase leaving the liquid-liquid contactor 10 through stream (11) contains mainly potassium salts and is conveyed to another multi-stage liquid-liquid contactor 12 wherein it contacts the nitric acid-loaded solvent (stream 15) resulting from the liquid-liquid contactor 8. The resulting aqueous phase (stream 13) consists of a solution containing potassium salts and nitric acid which are recycled into the cooled reaction vessel 3. The organic solvent solution possessing a selective extractability towards the hydrochloric acid enters through stream (16) into the liquid-liquid contactor 10 wherein it extracts the hydrochloric acid. The organic solvent extract loaded with the hydrochloric acid enters through stream (17) in another liquid-liquid contactor 18, wherein by washing with water (stream 19) it results in a substantially potassium-free, relatively concentrated aqueous solution of hydrochloric acid (stream 20) as by-product.

Taking in account that various streams at relative low temperatures are involved in the system, it is suggested for energy considerations and assistance in phase separation, to incorporate also heat exchange such as for example between stream (7) and stream (13).

The invention will be hereafter described by the following Examples, it being understood that it is presented only for a better understanding of the invention. In the Examples the various streams mentioned in the block diagram are referred to, the concentrations being given in wt. percent unless otherwise stated.

EXAMPLE 1 (see FIG. 1)

In the following Example, the step of nitrate ion removal will be illustrated in a more detailed manner presenting the various concentrations obtained at equilibrium, starting with an actual brine solution after removal of the potassium nitrate crystals, in a continuous run on a laboratory scale.

An amount of 90 ml/h of an aqueous acidic brine (stream 7) leaving the decanter vessel 5 and a suitable heat exchanger, entered a solvent extraction battery 8 consisting of 3 mixer-settlers arranged in series. This stream was contacted with about 470 ml/h of a 25% solution of tributyl phosphate in dearomatized kerosene (stream 12). The nitric acid—loaded solvent (stream 11) was washed in another solvent extraction battery (10) consisting of 4 mixer-settlers (arranged in series) by stream (14) of about 130 ml/h of tap water. The aqueous phase (stream 13) consisted essentially of nitric acid (to be recycled in the process) whereas the aqueous stream (9) leaving the battery was substantially nitrate-free and contained 230 g/l of HCl and 18 g/l of potassium ions. In the following Table 6 are presented the analyses of the individual ions, in order to illustrate the variation of concentrations within the extracting and washing batteries.

TABLE 6.

Concentrations in g/l of individual ions in the extraction and washing batteries.

| Stage | Organic phase | | | | Aqueous phase | | | |
|---|---|---|---|---|---|---|---|---|
| | ion $NO_3^-$ | $Cl^-$ | $K^+$ | $H^+$ | $NO_3^-$ | $Cl^-$ | $K^+$ | $H^+$ |
| $W_1$ | 0.43 | traces | — | 0.02 | 4.14 | traces | — | 0.07 |
| $W_2$ | 2.25 | traces | — | 0.05 | 21.7 | traces | — | 0.38 |
| $W_3$ | 7.43 | 0.5 | — | 0.13 | 50.9 | 2.5 | — | 0.9 |
| $W_4$ | 16.3 | 0.36 | — | 0.28 | 90.8 | 5.3 | — | 1.65 |
| Stream 7 | | | | | 133.0 | 208.4 | 15.6 | 7.48 |
| $E_1$ | 25.5 | 1.8 | — | 0.47 | 11.5 | 236.1 | 15.6 | 6.3 |
| $E_2$ | 1.9 | 10.3 | — | 0.45 | 0.28 | 239.6 | 15.6 | 6.2 |
| $E_3$ | 0.19 | 24.0 | — | 0.66 | 0.05 | 239.6 | 18.3 | 6.2 |

The Table above, presents each aqueous phase in equilibrium with its conjugated organic brine. The extraction stages are denoted by $E_1$ to $E_3$ and the washing stages by $W_1$ to $W_4$ respectively. Thus the organic phase of stage $W_1$ represents the washed organic phase (stream 12); the aqueous phase of stage $W_4$ represents stream (13); the organic phase of stage $E_1$ represents stream (11) and the aqueous phase of stage $E_3$ represents the hydrochloric acid solution (stream 9) leaving the system. From the above concentrations at equilibrium, it appears clearly the high efficiency of nitrate ion extraction over the chloride ion, so that a small number of stages will be sufficient to free the aqueous acidic brine of practically all of the dissolved nitrate ions.

EXAMPLE 2 (see FIG. 1)

An amount of 1000 kg/h of commercial (98%) potassium chloride (stream 2) was fed into a cooled reaction vessel at about $-20°$ C., together with 1310 kg/h of 60% nitric acid (stream 1) and stream (13) consisting of a recycled aqueous solution of nitric acid and minor amounts of hydrochloric acid. The resulting reaction mixture was decanted in vessel 5 and 1270 kg/h of crystals of potassium nitrate (on dry basis) were obtained in stream (6). The aqueous brine (stream 7) was contacted with a 20% (by vol) of a solution of tributyl phosphate in dearomatized kerosene, the phase volume ratio being 4:1 (organic:aqueous), the nitrate ion being extracted into the organic phase. The depleted brine (stream 9) amounting 2280 kg/h contained 20% (by wt.) hydrochloric acid, 2.8% of potassium chloride and minor amounts of sodium chloride. The loaded organic phase (stream 11) was washed by means of 1240 kg/h of water (stream 14). The aqueous solution obtained (stream 13) which contained 18.5% nitric acid and 5.5% hydrochloric acid, was recycled to the reaction vessel via an intermediate heat exchange with stream (7).

EXAMPLE 3 (see FIG. 2)

An amount of 1000 kg/h of commercial (98%) potassium chloride (stream 2) was fed into a cooled reaction vessel at about $0°$ C., together with 1380 kg/h (stream 1) of 60% nitric acid and a stream (13) of 2050 kg/h aqueous phase containing 400 kg/h of nitric acid and 64 kg/h of $K^+$ (potassium salts). Crystals of potassium nitrate amounting to 1350 kg/h with a purity of 98.5%, were obtained in stream (6). The brine stream (7) was washed by a solution of 6.4 m$^3$/h of tributyl phosphate in kerosene (30% by vol.), the ratio between the phases being about 2.5:1 (organic:aqueous).

The brine stream (9) entered a liquid-liquid contactor 10 wherein it was contacted with 7.5 m$^3$/h of washed iso-amyl alcohol containing 0.5 m$^3$/h water. The aqueous phase containing the potassium salts (stream 11) was distilled in vacuo, to recover the iso-amyl alcohol. The circulating brine (stream 11) was contacted with the $NO_3^-$-loaded tributyl phosphate solution (stream 15) and the resulting solution which contained about 19% $HNO_3$ was recycled to the process (stream 13). The HCl-loaded iso-amyl alcohol from the liquid-liquid contactor 10, was washed by 2.9 m$^3$/h of water (stream 19), the resulting stream (20) consisted of 3.2 m$^3$/h of an aqueous solution which contained 480 kg/h of hydrogen chloride and was substantially free of nitrate and potassium ions.

EXAMPLE 4 (see FIG. 1)

An amount of 1000 kg/h of commercial (98%) potassium chloride (stream 2) was fed into a reactor 3 kept at $0°$ C., together with 1330 kg/h (stream 1) of 60% nitric acid. The reaction mixture was continuously conveyed from the reactor 3 as stream (4) to a solid liquid separator 5. A stream of solid potassium nitrate was separated, which upon washing and drying, yielded 1290 kg/h of $KNO_3$ of 99% purity. In addition to that a liquid phase (stream 7) resulted from the separator 5 and was contacted with a stream (12) of washed commercial methyl iso-butyl ketone (MIBK) in a series of six mixers-settlers, at a phase volume ratio of 1:1.3 (aqueous:organic).

The extracted aqueous stream (9) leaving the extraction step had an hourly throughput of 2100 liters and contained 20% HCl, 1.3% KCl and 2% MIBK (dissolved therein). This stream was then freed of its MIBK content by conventional azeotropic distillation, yielding an azeotrope containing 76% of MIBK which was returned to the extraction stage. The loaded-MIBK phase (stream 11) leaving the extraction battery 8, was washed by means of 1300 l/h of water (stream 14) in a washing step 10, the volume ratio between the phases being 2.1:1 (organic:aqueous). The aqueous stream (16) leaving the washing step, contained 20% $HNO_3$ and 0.4% of HCl, and was recycled to the reaction stage.

We claim:

1. A process for the manufacture of potassium nitrate from potassium chloride and nitric acid, which comprises the steps of:

(a) carrying out the reaction between potassium chloride and nitric acid in an aqueous medium at a temperature in the range of between $-25°$ C. to $+10°$ C. said reactants being in the range of 0.9 mole of $HNO_3$ per mole of KCl and up to 3 moles of $HNO_3$ per mole of KCl, (b) Separating the crystals of potassium nitrate from the resulting brine containing $K^+$, $Cl^-$, $H^+$ and $NO_3^-$ ions, (c) Extracting the nitric acid from the brine obtained in step (b) by an organic solvent solution containing at least one compound selected from the group consisting of ketones having five to ten carbon atoms, straight or cyclic polyethers having molecular weight in the range of 100 to 1000, polyalkylene glycols slightly miscible in water and having molecular weight in the range of 1000 to 3000 and organic esters of phosphoric acid, phosphonic and phosphinic acid or mixtures thereof in an organic diluent which does not substantially extract hydrochloric acid, obtaining a $NO_3^-$-loaded solvent extract and producing a $NO_3^-$-free brine containing hydrochloric acid, and (d) Washing the $NO_3^-$-loaded solvent extract, the recovered aqueous nitric acid being recycled into step (a).

2. A process for the manufacture of potassium nitrate according to claim 1, wherein hydrochloric acid is obtained from the $NO_3^-$-free brine resulted in step (c), by contacting said brine with an organic solvent comprising at least one of the compounds selected from the group consisting of primary, secondary and teriary alcohols sparingly soluble in water, said organic solvent being optionally admixed with an organic diluent, and contacting the hydrochloric acid-loaded solvent with water, recovering a concentrated hydrochloric acid solution.

3. A process for the manufacture of potassium nitrate according to claim 2, wherein the organic solvent solution to extract the hydrochloric acid is selected from butanols and pentanols.

4. A process for the manufacture of potassium nitrate according to claim 1, wherein hydrochloric acid is obtained from the brine resulting in step (c) by distillation.

5. A process for the manufacture of potassium nitrate according to claim 1, wherein the reaction temperature is in the range of $-20°$ C. and $0°$ C.

6. A process for the manufacture of potassium nitrate according to claim 1, wherein the organic solvent solution for extracting the nitric acid contains at least one compound selected from: methyl isobutyl ketone, methylcyclohexanone methyl ethyl ketone, methyl propyl ketone.

7. A process for the manufacture of potassium nitrate according to claim 1, wherein the organic diluent is selected from toluene, dearomatized kerosene and benzene.

8. A process for the manufacture of potassium nitrate according to claim 1, wherein significant amount of energy is saved by heat exchange of the cold streams with other streams of the process running at ambient or higher.

9. A process for the manufacture of potassium nitrate according to claim 1, wherein the equipment used is made from polyvinyl chloride.

10. A process for the manufacture of potassium nitrate according to claim 9, wherein butanol or pentanol is present in the range of 1 part tributyl phosphate to 7 parts butanol or pentanol to 12 parts of tributyl phosphate to 1 part butanol or pentanol.

11. A process for the manufacture of potassium nitrate according to claim 1, wherein the organic solvent solution for extracting the nitric acid contains at least one compound selected from: tributyl phosphate, trioctyl phosphine oxide, triphenyl phosphine oxide, tributyl phospine oxide and hydrogen dibutyl phosphate.

* * * * *